Nov. 17, 1959 W. D. ROWE 2,913,597

SINGLE TRANSISTOR FULL WAVE RECTIFIER

Filed April 20, 1954

United States Patent Office 2,913,597

Patented Nov. 17, 1959

2,913,597

SINGLE TRANSISTOR FULL WAVE RECTIFIER

William D. Rowe, Maplewood, N.J., assignor to Westinghouse Electric Corporation, East Pittsburgh, Pa., a corporation of Pennsylvania Application April 20, 1954, Serial No. 424,340

7 Claims. (Cl. 307—88.5)

My invention relates to transistors and in particular relates to novel types of operating circuits for transistors which produce circuit components capable of well known uses in many types of alternating current circuits.

Transistors of different physical structure of several types have become known in the last few years and reference may be made to the book "Principles of Transistor Circuits," by Richard F. Shea, published by John Wiley & Sons, New York, 1953, for a description of typical transistors to which my invention is capable of being applied. My invention may be applied to a junction type transistor as the principal circuit component. Furthermore, transistors are frequently classified as of the p-n-p type and n-p-n type. While my invention is applicable to both types, I have illustrated in the figures as applied to the p-n-p type. If it were applied to the n-p-n type the polarities of all voltages occurring in the circuit would simply be reversed.

Transistors have many properties similar to those of grid controlled electron tubes and are accordingly applicable in alternating current circuits to perform many of the functions familiar in the case of such tubes. Thus transistors may be used to supply in an output circuit currents and voltages which are amplified in case of currents flowing in an input circuit; and the input and output circuits are like those usually in electrode tube circuits in having one common terminal for the input and output circuits. Similarly this common terminal is usually grounded, and may be spoken of as the "ground" terminal.

As is shown in the above-mentioned Shea book, the transistor comprises two junctions each comprising semiconducting materials of two opposite conducting types; in one of which materials current is conducted by a migration of electrons, this being called the n type; and the other a material in which there is a deficiency of electrons and current conduction occurs as if it were a migration of positive electricity, thus giving rise to the designation p-type conductivity. Thus a junction-type transistor comprises a layer of n-type semiconductor sandwiched between two layers of p-type semiconductor. In an n-p-n-type transistor respective inside and outside layer materials are just the reverse of the p-n-p type just described.

It is found that when a single junction between a p-type and an n-type material has a voltage impressed across it which makes the p-type material positive relative to the n-type, current flows fairly readily and the junction has a relatively low effective resistance. On the other hand, when the p-material is made negative in voltage relative to the n-type, the junction has a relatively high voltage. In this respect, the junction is like an electron tube having a hot cathode and cold anode, and acts as an excellent rectifier of alternating current just as does such an electron tube.

It is customary to speak of current conduction in a p-type material, in which as above stated there is a scarcity of free electrons, as conduction by "holes." If in a p-n-p type transistor one of the p-type layers is made negative relative to the base, holes are rapidly drawn out of the p-type layer and electrons are drawn out of the base and only a relatively minute current flows between these layers unless holes are injected into the base by making the other p-type layer positive in voltage relative thereto. These injected holes migrate by diffusion through the base toward the junction with the negative p-layer; flow through that junction and constitute a current in the circuit connected thereto. Thus the number of holes injected into the base therefore governs current flow out of the other p-layer and it is possible for a relatively small energy in the injection to control a considerably larger energy flow in the outgoing circuit. This is the most typical and valuable property of the transistor and the outside layer which injects the holes as referred to as the "emitter"; and the outside layer to which the outgoing circuit is connected is called the "collector." A transistor thus consists of a base of semiconductor of one type sandwiched between an emitter and a collector each of the opposite conductivity type material.

It is found that the common terminal of the input and output circuits may be connected to either the base, the emitter, or the collector; and when this is done, the relation between current and voltage in the input and output circuits are different for three types of circuits resulting from such connections. Thus, if an alternating voltage is impressed in the circuit connecting the emitter to the base, an alternating voltage of amplified power may be derived from the circuit connecting the collector and the base. My present invention results from the discovery that by suitably altering the value of a bias voltage in the input circuit, the phase of the voltage in the output circuit may be changed through 180° relative to the alternating input voltage only when using a base input configuration.

One object of my invention is accordingly to provide a novel circuit by which the phase of an output voltage relative to an input voltage may be changed through 180° by varying a bias voltage in the input circuit.

Another object of my invention is to provide a novel transistor network in which the phase of the alternating output voltage relative to the alternating input voltage may be varied at will by one hundred and eighty degrees.

Another object of my invention is to provide a novel transistor network in which the simple closure of a switch will change the alternating output circuit from coincidence of phase to opposition in phase to that of the input circuit.

Another object of my invention is to provide a novel type of transistor circuit in which a unipotential pulsating voltage results in the output circuit when an alternating voltage is impressed on the input circuit.

Still another object of my invention is to provide a transistor circuit of a novel type which acts like a full-wave rectifier when an alternating voltage is impressed on its input circuit.

Other objects of my invention will become apparent through reading the following description and in connection with the drawings in which.

Figures 1, 2, 3, 4, 5:
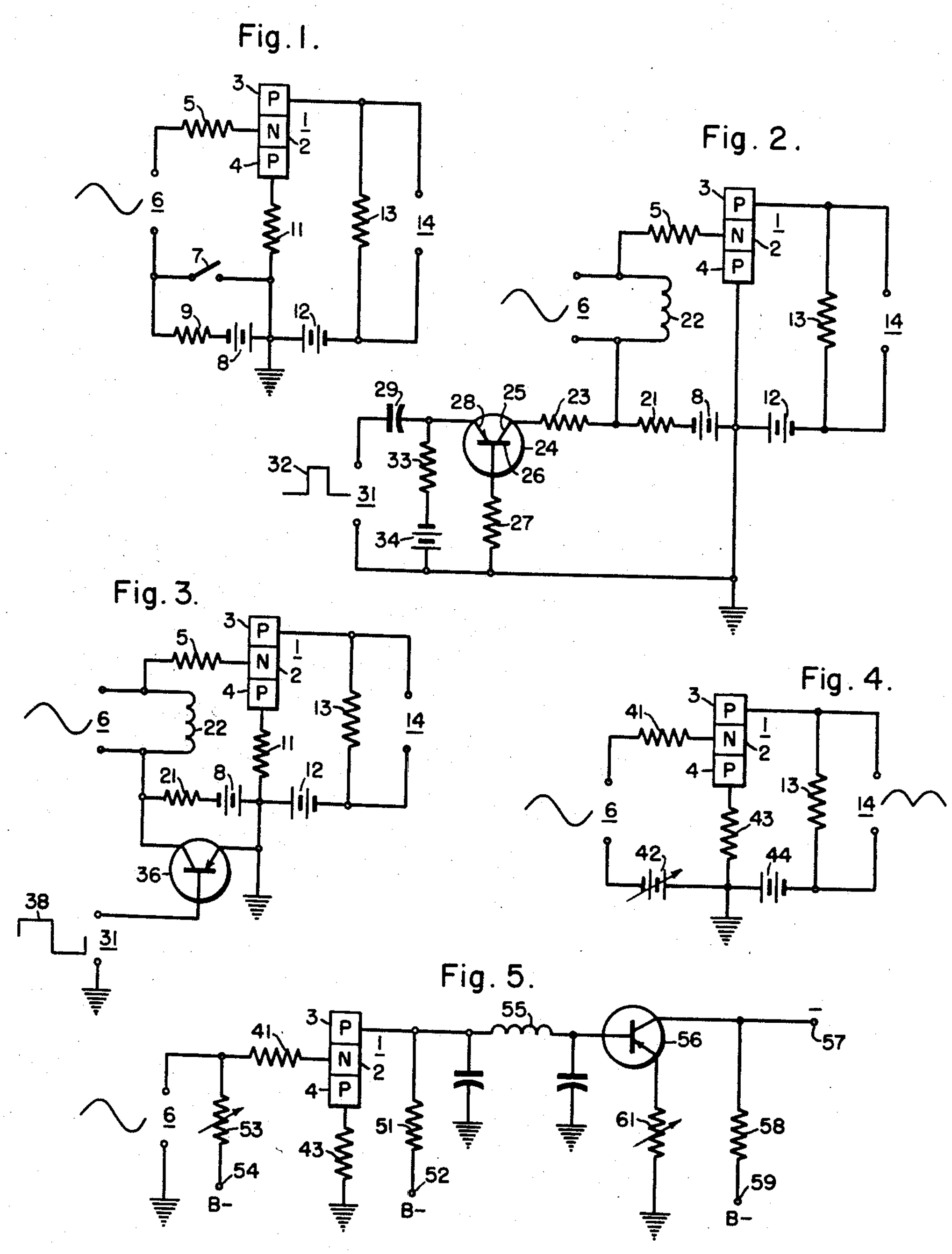
Figure 1 is a schematic diagram of a junction-type transistor circuit embodying the principles of my invention.
Fig. 2 is a schematic diagram of a trigger circuit employing the invention of Fig. 1 for certain useful purposes well known in the art.
Fig. 3 is a similar diagram of another circuit capable of performing the same functions as that of Fig. 2.
Fig. 4 is a schematic diagram of a circuit embodying the principles of my invention to act as a full-wave rectifier of alternating current.
Fig. 5 is a schematic diagram of a circuit for employing the principles of my invention in an amplitude-controlled detector of alternating signal waves.

Referring in detail to Fig. 1 a junction-type transistor 1 which may be of the p-n-p type has a base 2 of an n-type semiconductor sandwiched between outside layers 3 and 4 comprising p-type conductors. The base 2 is connected through a resistor 5 and a source 6 of alternating input voltage to a switch 7 which, when closed, short circuits a direct current voltage source 8 in series with a resistor 9. The positive terminal of the voltage source 8 is connected through a resistor 11 to the transistor plate 4, and is also connected through a source of direct current voltage 12 and a resistor 3 to the transistor plate 3. An output circuit 14 is connected across the terminals of the resistor 13. The voltage source 12 has its positive terminal connected to the positive terminal of the voltage source 8.

When the switch 7 is closed there is produced across the output terminals 14 an alternating voltage which is 180° out of phase with alternating voltage impressed across the input terminal 6. This corresponds to action of the transistor 1 as if its plate 4 were an emitter electrode and its plate 3 a collector electrode.

When the voltage source 8 is larger in value than the voltage source 12, I find that, upon opening the switch 7, the voltage on the output terminals 14 is reversed from its former phase and is so phased with the alternating voltage impressed on input terminals 6. The values to be given to the resistors 5, 9, 11 and the voltages 6, 8 and 12 are, except as just stated, dependent on the electrical characteristics of the transistor 1 which was described in the above mentioned book, and may be designed accordingly, however, to give a typical illustration of an operable circuit. The transistor may be of the Raytheon Manufacturing Company's type CK–721, or may be the Westinghouse Electric Corporation's type WX–4813. The resistor 5 may be 50,000 ohms, the resistor 11 500 ohms, the resistor 13 1000 ohms, the resistor 9 may be 10,000 ohms. The voltage source 8 may be of the order of 7 volts and the voltage source 12 of the order of 6 volts. The alternating voltage on input terminal 6 may be 1 volt.

Fig. 2 illustrates the control of the circuit of Fig. 1 by means of rectangular voltage pulses in response to which the polarity of the output voltage is periodically reversed. Thus, the transistor 1 has its base 2 connected through a resistor 5, a pair of input terminals 6, and a resistor 21 to the negative terminal of a direct current voltage source 8, the positive terminal of which is connected to the transistor plate 4. The transistor plate 4 is also connected through a direct current voltage source 12 and a load resistor 13 to the transistor plate 3. Output terminals 14 are connected across the resistor 13. An inductance 22 is conected across the input terminals 6 to transmit the bias voltage of source 8 to the base 2. The common terminal of resistor 21 and inductance 22 are connected through a resistor 23 to the collector electrode 25 of a transistor 24 having a base 26 which is connected through a resistor 27 to the positive terminal of voltage source 8. The transistor 24 is of the point contact type. Its emitter electrode 28 is connected through a blocking capacitor 29 to one terminal on input circuit 31 on which a rectangular voltage pulse 32 is impressed. Emitter 28 is connected through a resistor 33 to the negative terminal of a direct voltage source 34 the positive terminal of which is connected to one terminal of the input circuit 31 and to the positive terminal of the voltage source 8.

When the lower potential values of the input pulse 32 are impressed on the input circuit 31 current flows in the resistor 21 in such a direction as to make the upper terminal of the resistor 21 positive relative to its lower terminal and accordingly the transistor 1 behaves like a grounded emitter transistor so that the voltage impressed across the output terminals 14 is 180° out of phase with the alternating voltage impressed across input terminal 6. On the other hand, when the positive peak of the pulse 32 is impressed across the input terminals 31, the resistor 21 acts to impress a negative voltage on the base 2 of transistor 1 and thereby reverses the polarity of the output voltage across the terminals 14 so that it is in phase with the alternating voltage impressed across input terminal 6.

The input pulses 32 accordingly periodically reverse the phase of the output voltage across terminals 14 relative to the input voltage across terminals 6. Such a circuit in which a ripple of input pulses reverses the relative phase of alternating output voltage relative to an input voltage has numerous uses well known in the electronics art. One instance is for use as a gating device in well known types of electronic computers.

Fig. 3 shows a circuit alternative to Fig. 2 for reversing at will the phase of an alternating output voltage relative to that of an alternating input voltage. In Fig. 3 a junction-type transistor 1 has one outer layer 4 connected to ground through a feed-back resistor 11. The outer layer 3 is connected to ground through a load resistor 13 shunted by output terminals 14. The base layer 2 of transistor 1 is connected to ground through a resistor 5, input terminals 6, resistor 21 and direct current source 8. The common junction of resistor 21 and input terminal 6 is connected to the collector layer of a transistor 36 which has its emitter grounded and its base layer connected to one side of a signal source 31 which is impressed with rectangular or other desired voltage pulses 38, and which has its other side grounded. When the voltage pulses 38 are positive the voltage on output terminals 14 is one hundred and eighty degrees out of phase with an alternating input voltage impressed on terminals 6; and when the voltage pulses 38 are negative then voltage on output terminal 14 is cophasal with the voltage on input terminals 6.

The circuit of Fig. 4 comprises a transistor 1 having its base 2 connected through a resistor 41 and a pair of input terminals 6, a source of variable direct current voltage 42 and a resistor 43 to its side plate 4. The other side plate 3 is connected through a resistor 13 and a source of direct current voltage 44 to the common terminal of the voltage source 42 and resistor 43. A pair of output terminals 14 are connected across the resistor 13.

The positive terminals of the voltage sources 42 and 44 are connected together to the resistor 43 and may be grounded.

I have found that if an alternating voltage is impressed across the input terminal 6 and the voltage source 42 is adjusted to the correct value, a rectified full-wave output voltage will be produced across the output terminals 14. The relative amplitude of the half waves of this output voltage depends upon the relative values of the voltage sources 42 and 44 but by adjusting these relative values the two half waves may be made of equal amplitude to resemble the typical output of a full-wave rectifier. While the respective values of the resistors 13, 41 and 43 depends upon the electrical characteristics of the transistor 1 which was explained in the above-mentioned book and now well known in the art, I will give the following as a typical operative circuit producing wave forms such as I have mentioned. Transistor 1 may be Raytheon CK–721 type or Westinghouse type WX–4813. Resistors 13, 41 and 43 may be respectively of 1,000, 50,000, 500 ohms, voltage source 42 may have a value of 6.9 volts and voltage source 44 a value of 7 volts, such that the voltage difference between the base lead and ground is zero, and an alternating voltage of 0–50,000 cycles and 6 volts may be impressed across the input terminals 8. I usually found that the adjusted value of the voltage source 42 should be nearly equal to the voltage of source 44 when symmetrical full-wave output is produced across the output terminals 14. The polarities of the voltage sources 42 and 44 correspond to the transistor 1 being of p-n-p type and would be reversed were an n-p-n type transistor substituted for it.

If the voltage impressed across input terminals 6 is a communication signal, the voltage across output terminals 14 will of course be a demodulation thereof. With the transistor and circuit components mentioned above, it will be found that the circuit has a low output impedance making it suitable for efficiently supplying a grounded emitter amplifier. An overall voltage gain as high as 40 db can be had.

Fig. 5 embodies the principles of the Fig. 4 circuit in a system particularly adapted to full-wave detection of an alternating wave. A first transistor 1 of the junction type has its outer layer 4 connected to ground through a feed-back resistor 43, and has its outer layer 3 connected through a load resistor 51 to the negative pole 52 of a direct current source, marked B—, having its positive pole grounded. The base layer of transistor 1 is connected to ground through a resistor 41 and an alternating source 6 which may for example represent a signal-modulated carrier. One of the terminals 6 is grounded and the other connected through an adjustable resistor 53 to the negative pole 54 of a direct current source having its positive pole grounded.

The outer layer 3 of transistor 1 is connected through a filter 55 of well-known type to the base layer of a second transistor. The collector terminal of transistor 56 is connected to the output terminal, and also through load resistor 58 to the negative terminal 59 of a direct current voltage source having its positive terminal grounded. Terminal 57 constitutes the negative side of the output circuit, ground being its other side. An adjustable resistor 61 connects the emitter terminal of transistor 56 to ground. This circuit detects and amplifies the input voltage impressed on terminals 6, the signal gain through the network being adjustable by regulating the resistor 61.

Fig. 4 may likewise have its output terminals connected to the input circuit of an oscillator to control the output of the latter so that with zero signal, or zero negative feedback from the oscillator, the latter generates no oscillations; but when feedback from the oscillator output to the input terminals 6 is positive, the oscillator will generate oscillations. A blocking oscillator may be produced in this way.

I claim as my invention:

1. A junction transistor having a base layer sandwiched between a pair of outer layers, a current path connecting said base layer to one of said outer layers comprising a first resistor, a pair of input terminals, and a second resistor in series with a first direct current voltage source, a switch for imposing a short circuit across said direct current voltage source and said second resistor, and a current path comprising a load resistor and a second direct current voltage source connecting the other outer layer with the terminal of said first voltage source which is remote from said base layer, the terminals of the two said direct current voltage sources being adjacent to each other, and a pair of output terminals connected across said load resistor.

2. The circuit specified in claim 1 with the addition of a third resistor connecting the first said outer layer to said voltage sources.

3. In combination, a junction transistor having a base layer of one conductivity type material sandwiched between two outer layers of the opposite conductivity type material, a first source of direct current having one terminal connected to one of said outer layers, a pair of input terminals adapted for connection to a source of alternating current voltage, a first impedance element connecting one of said input terminals to said base layer, a second impedance element connecting the other of said input terminals to the other terminal of said first direct current source, a second source of direct current having one terminal connected to said one outer layer, a current path including a load impedance connecting the other terminal of said second direct current source to the other of said outer layers, and a switching device connected in shunt with said first direct current source and said second impedance element.

4. In combination, a junction transistor having a base layer of one conductivity type material sandwiched between two outer layers of the opposite conductivity type material, a first source of direct current having one terminal connected to one of said outer layers, a pair of input terminals adapted for connection to a source of alternating current voltage, a first impedance element connecting one of said input terminals to said base layer, a second impedance element connecting the other of said input terminals to the other terminal of said first direct current source, a second source of direct current having one terminal connected to said one outer layer, a current path including a load impedance connecting the other terminal of said second direct current source to the other of said outer layers, and a direct current path including the collector and base of a second transistor connected in shunt with said first direct current source and said second impedance element.

5. In combination, a junction transistor having a base layer of one conductivity type material sandwiched between two outer layers of the opposite conductivity type material, a first source of direct current having one terminal connected to one of said outer layers, a pair of input terminals adapted for connection to a source of alternating current voltage, a first impedance element connecting one of said input terminals to said base layer, a second impedance element connecting the other of said terminals to the other terminal of said first direct current source, a second source of direct current having one terminal connected to said one outer layer, a current path including a load impedance connecting the other terminal of said second direct current source to the other of said outer layers, and a direct current path including the emitter and collector of a second transistor connected in shunt with said first direct current source and said second impedance element.

6. In combination, a junction transistor having a base layer of one conductivity type material sandwiched between two outer layers of the opposite conductivity type material, a first direct current path connecting said base layer to one of said outer layers, said first path including a pair of input terminals adapted for connection to a signal source and a first source of direct current voltage, a second current path including a second direct current voltage source and a load impedance connecting the other of said outer layers to said one outer layer, and a direct current path including a switching device connected to shunt current around said first direct current voltage source.

7. In combination, a junction transistor having a base layer of one conductivity type material sandwiched between two outer layers of the opposite conductivity type material, a first current path connecting said base layer to one of said outer layers, said first path including a pair of input terminals adapted for connection to a signal source and a first source of direct current voltage, a second current path connecting the other of said outer layers to said one outer layer, said second path including a second source of direct current voltage and a load impedance, and a direct current path including a transistor switching device connected to shunt current around said first direct current voltage source.

References Cited in the file of this patent

UNITED STATES PATENTS

| | | |
|---|---|---|
| 2,663,806 | Darlington | Dec. 22, 1953 |
| 2,666,814 | Shockley | Jan. 19, 1954 |
| 2,728,857 | Sziklai | Dec. 27, 1955 |
| 2,736,765 | Lohman et al. | Feb. 28, 1956 |
| 2,750,452 | Goodrich | June 12, 1956 |

FOREIGN PATENTS

| | | |
|---|---|---|
| 748,257 | Great Britain | Apr. 25, 1956 |